Aug. 24, 1954

G. GUANELLA 2,687,476

MEANS FOR AND METHOD OF FREQUENCY CONVERSION

Filed April 28, 1949

INVENTOR.
GUSTAV GUANELLA

BY

ATTORNEY

Patented Aug. 24, 1954

2,687,476

UNITED STATES PATENT OFFICE 2,687,476

MEANS FOR AND METHOD OF FREQUENCY CONVERSION

Gustav Guanella, Zurich, Switzerland, assignor, by mesne assignments, to Radio Patents Company, a partnership Application April 28, 1949, Serial No. 90,125

5 Claims. (Cl. 250—36)

The present invention relates to a system for and method of converting a carrier signal of given frequency into a signal of different frequency, more particularly, though not limitatively, to improved means for converting the incoming signal or receiving frequency in a radio relay station into a signal of different output or transmitting frequency.

In the transmission of signals by means of very short radio waves, it is customary, in view of the limited propagation range of such waves, to use relay stations which serve to receive a high frequency signal beam and to re-transmit the signals with a different carrier frequency. In order to effect a frequency conversion between the received and re-transmitted signals, it is known to combine or heterodyne the received signals with at least one auxiliary or displacement carrier oscillation and to utilize the resultant sum or difference frequency signal for the further transmission.

A disadvantage of known arrangements of this type is due to the fact that the heterodyning oscillation must be produced by an auxiliary or local oscillator, whereby any frequency variation or drift of the oscillator will result in a corresponding fluctuation of the frequency of the re-transmitted waves or oscillations. As a result, if the transmission chain or system comprises a large number of relay stations or links, substantial carrier frequency fluctuations of the signals received at the end of the chain may occur by cumulative action as a result of the instability of the auxiliary oscillators in the various relay stations. These fluctuations must be taken care of either by providing transmission systems or devices having a sufficiently wide transmission bandwidth, by the provision of automatic frequency control devices or by the employment of special means and precautions to insure an adequate frequency stability of all heterodyning or displacement carrier oscillators, in such a manner that temperature variations, changes of the operating voltages and other effects will be substantially without influence upon the frequency of the auxiliary oscillations. All these means and measures result in increased costs and other disadvantages and defects of both technical and practical nature.

An object of the present invention is the provision of a novel system for and method of frequency conversion, especially though not limitatively suitable for use in high frequency radio relays, by which the above drawbacks and defects are substantially avoided.

A more specific object of the invention is the provision of a frequency conversion system for radio relay stations operating with extremely high frequency oscillations which are combined or heterodyned with an auxiliary oscillation and wherein the ratio between the frequency of the incoming and outgoing oscillations is substantially constant.

With the above and further objects in view, as will become more apparent from the following description, the invention generally contemplates the use of at least one heterodyne frequency converter or mixer to which are applied the incoming signals. The output signal of said converter having an intermediate frequency is passed in succession through an intermediate frequency amplifier, an amplitude limiter and at least one frequency multiplier. There is derived from the output of said frequency multiplier at least one harmonic oscillation of the intermediate frequency and applied to said converter to serve as an auxiliary or heterodyning oscillation. The same or a different harmonic of the intermediate frequency serves to excite the transmitter or output circuit to produce output oscillations having a frequency which bears a constant ratio or relation to the received or incoming frequency.

It has already become known to use an arrangement for frequency division, wherein the frequency to be converted is intermodulated or heterodyned with an auxiliary oscillation derived from the intermediate frequency by way of a frequency multiplier. In arrangements of this type of regenerative frequency division, the input frequency is always a whole number multiple of the output frequency. In the system according to the present invention, on the other hand, the input frequency is no longer a whole number multiple of the output frequency of the converter, but the input and output frequencies are related to each other as two whole numbers. In contrast to the known arrangements, the frequency conversion system according to the invention may be employed not only for sinusoidal oscillations of constant frequency and amplitude, but is especially adapted, by the employment of special means, for use with oscillations which are either amplitude or frequency modulated in accordance with a signal or message being transmitted.

Further objects and novel aspects of the invention will become more apparent from the following detailed description taken in reference with the accompanying drawing forming part of this specification and wherein.

Like reference characters identify like parts in the different views of the drawing.

Figures 1, 2, 3, 4:
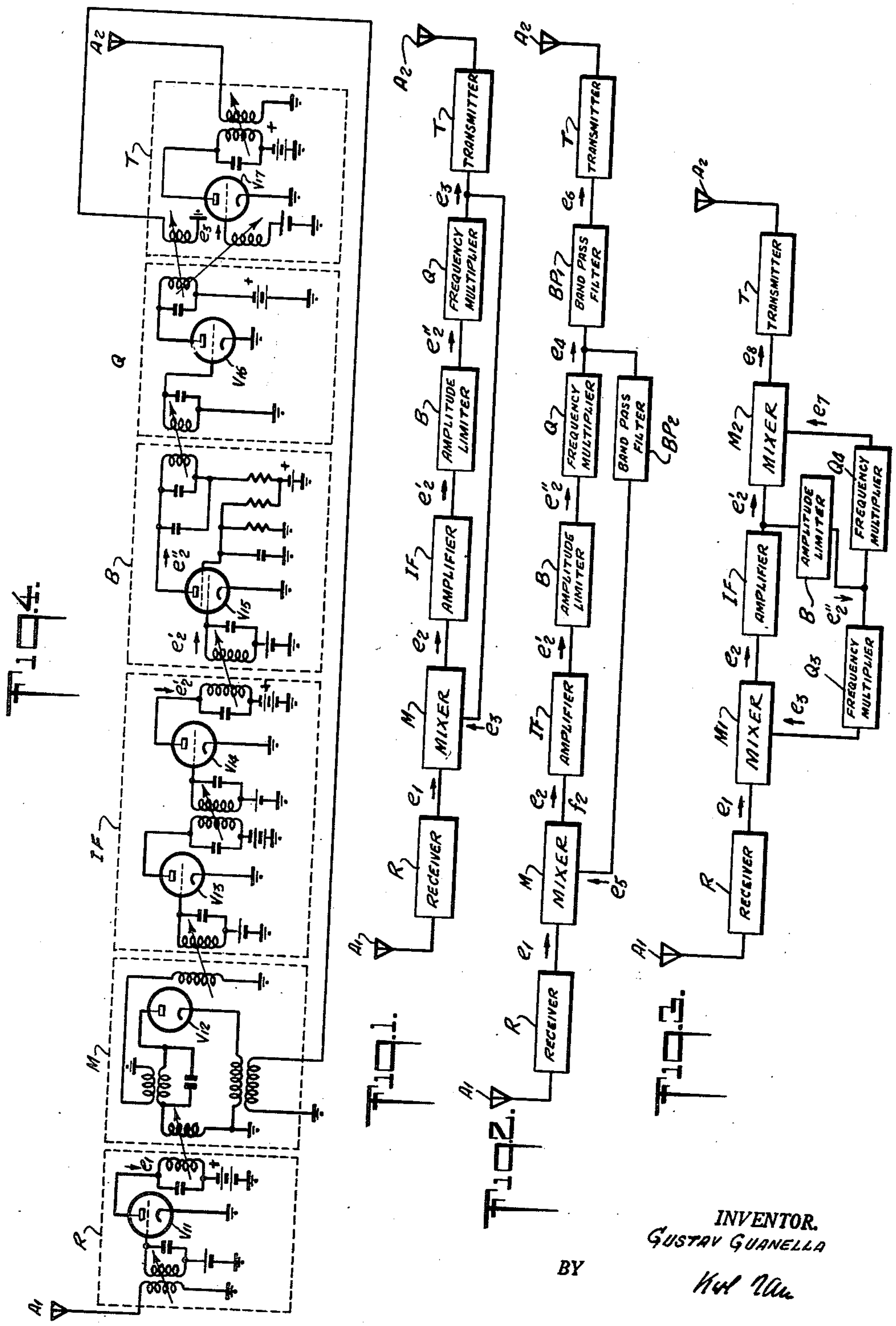
Fig. 1 is a block diagram of a relay station embodying an improved frequency converter constructed in accordance with the principles of the invention.
Fig. 2 and Fig. 3 are similar block diagrams illustrating improvements and modifications of the invention.
Fig. 4 shows a more detailed wiring diagram of a relay station embodying a frequency converter circuit of the type according to Fig. 1.

Referring more particularly to Fig. 1, there is shown a simple embodiment of a radio relay station incorporating a frequency converter according to the invention. $A_1$ and $A_2$ represent the receiving and transmitting antennae, respectively. The incoming high frequency oscillations $e_1$, after amplification in the receiver R, and having a frequency $f_1$ are combined or heterodyned in the mixer or frequency converter M with an auxiliary or heterodyning oscillation $e_3$ having a frequency $f_3$. As a result, an oscillation $e_2$ is obtained from the output of the modulator M having a frequency $f_2$ equal to the difference frequency $f_1-f_3$. Upon amplification of the intermediate frequency signal $e_2$ by the intermediate frequency amplifier IF, there is obtained an alternating voltage or signal $e_2'$ which by limiting by means of the amplitude limiter B will provide an oscillation $e_2''$ having an amplitude which is constant or independent of the incoming signal amplitude. Signal $e_2''$ is in turn applied to a frequency multiplier Q to produce a high frequency oscillation $e_3$ having a frequency $f_3$ which is a whole number multiple $n$ of the intermediate frequency $f_2$, i. e. $f_3=n.f_2$. This oscillation is utilized as auxiliary or heterodyning signal and applied for this purpose to the modulator or frequency converter M. From this, it follows that $$f_3=n(f_1-f_3) \text{ or } f_3=\frac{n}{n+1}\cdot f_1$$

From the foregoing it follows that the high frequency output oscillation $e_3$ which is applied to the transmitter T and retransmitted by the antenna $A_2$ bears a constant frequency relation to the input signal or voltage $e_1$ determined by the multiplication factor $n$ of the multiplier Q. This frequency relation is independent of any auxiliary frequency generated within the relay station and is a ratio between whole numbers. The frequency multiplier may advantageously be in the form of a self-excited generator which is synchronized with the intermediate frequency signal frequency $f_2$ and is capable of producing well defined harmonic frequencies, such as a multivibrator or other harmonic generator of known design.

An arrangement described hereinbefore may operate with a stable frequency conversion only if the frequency $f_3$ is smaller than the frequency $f_1$. Accordingly, the arrangement may be employed only if the outgoing frequency of the relay station is to be smaller than its input frequency. In order to enable the attainment of any desired frequency relation between the incoming and outgoing oscillations, i. e. including a ratio greater than 1, a modified arrangement as shown by the block diagram of Fig. 2 may be used. The latter utilizes a suitable harmonic generator such as a multivibrator to serve as a frequency multiplier Q. The latter produces a frequency mixture $e_4$ consisting of a number of harmonics, $nf_2$, $2nf_2$, $3nf_2$, . . . , of the intermediate frequency $f_2$. A component $e_5$ is segregated from the mixture $e_4$ by means of a band pass filter $BP_2$, the frequency $f_5$ of said component being equal to $n_2$ times the intermediate frequency $f_2$. This component is applied to the mixer M to serve as auxiliary or heterodyning oscillation. Accordingly:

$$f_5=n_2.f_2=n_2(f_1-f_3)=\frac{n_2}{n_2+1}\cdot f_1$$

There is derived a further harmonic $e_6$ from the frequency mixture $e_4$ by means of the bandpass filter $BP_1$, said further harmonic having a frequency $f_6$ which is a whole number multiple $n_1$ of the intermediate frequency $f_2$. Accordingly:

$$f_6=n_1\cdot f_2=n_1(f_1-f_3)$$

Thus, by a proper choice of the harmonic factors $n_1$ and $n_2$, it is possible to obtain a desired output frequency as follows:

$$f_6=n_1\cdot\left(1-\frac{n_2}{n_2+1}\right)\cdot f_1=\frac{n_1}{n_2+1}\cdot f_1$$

From the above it is seen that the output frequency $f_6$ may be greater than the incoming or received frequency $f_1$.

As is understood, the harmonic generator Q and band pass filters $BP_1$ and $BP_2$ may be replaced by a pair of separate frequency multipliers having different multiplication factors to obtain oscillations $e_5$ and $e_6$ of proper frequency in relation to the intermediate frequency $f_2$.

The arrangements shown are especially suited for the transmission of frequency modulated signals by way of one or more relay stations. In this case, the intermediate frequency signals are brought to a constant amplitude level by the amplitude limiter B, independently of the amplitude of the incoming signals. This in turn results in a constant amplitude of the output signals or oscillations $e_3$ or $e_6$, respectively. Since the same frequency ratio prevails at any time between the frequency of the output oscillations and the frequency of the input oscillations, this ratio equally applies to variations of the output frequency caused by corresponding variations of the input frequency. As a result, the maximum frequency deviation or depth of modulation in the case of a frequency modulated signal will be reduced to a degree depending upon the frequency conversion ratio of the relay station. Since, however, in practice the transmitting or output frequency deviates only slightly from the input or received frequency, the reduction of the total frequency deviation is only slight and practically negligible.

In case of amplitude modulated signals, any amplitude limiting in the main transmission path should be avoided. For this purpose, a system of the type shown in Fig. 3 may be used. In the latter, a first frequency conversion is effected in the mixer $M_1$, whereby the heterodyning or auxiliary oscillation $e_3$ is again obtained from the intermediate frequency signal $e_2$ in the same manner as in Fig. 1 by amplification of the output voltage of the mixer by the intermediate frequency amplifier IF and subsequent amplitude limiting by means of the limiter B and frequency multiplication by means of the multiplier $Q_3$. As a result, the original voltage $e_2'$ obtained from the output of intermediate frequency amplifier will not be amplitude limited so that the amplitude modulated oscillations may be transmitted free from distortion. The frequency $f_2$ of this voltage is as follows:

$$f_2=f_1-f_3=f_1-n_3.f_2=\frac{1}{n_3+1}\cdot f_1$$

wherein $n_3$ represents the multiplication factor of the multiplier $Q_3$. A further frequency conversion is effected in the mixer $M_2$ by means of the auxiliary heterodyning oscillation $e_7$. The latter is produced from the intermediate frequency signal $e_2''$ by the aid of a further frequency multiplier $Q_4$ having a multiplication factor $n_4$ and being connected to the output of the limiter B. Accordingly, the frequency of the signal $e_7$ will be equal to $f_7=n_4.f_2$. The output of the mixer $M_2$ supplies a voltage or signal $e_8$ whose frequency, in the case of utilizing the sum frequencies produced by said modulator, will be equal to $$f_8=f_7+f_2=(n_4+1).f_2=\frac{n_4+1}{n_3+1}\cdot f_1$$

It is also possible to utilize the difference frequencies $f_7-f_2$ produced by the mixer $M_2$ in which case the output frequency will be as follows:

$$f_8'=\frac{n_4-1}{n_3+1}\cdot f_1$$

Since the amplitude limiter is located outside the main transmission path, i. e. in the paths for the auxiliary or heterodyning oscillations, only the latter will be limited or brought to a constant amplitude, while the amplitudes of the amplitude modulation of the signals $e_1$, $e_2$, $e_2'$ and $e_8$ passing through the main transmission path are maintained in such a manner that the amplitude modulation of the received signals will not be suppressed and the signals transmitted without distortion. In place of separate frequency multipliers $Q_3$ and $Q_4$ in Fig. 3, a common harmonic wave generator may be provided together with a pair of band pass filters for selecting oscillations of suitable frequency, as will be readily understood.

Fig. 4 shows a more detailed wiring diagram for a system corresponding to the block diagram of Fig. 1. The frequency conversion in the mixer M is effected by means of a diode mixer $V_{12}$, in a manner well known and understood. The frequency multiplier Q consists of an over-excited triode $V_{16}$ also of conventional design. The amplitude limiter B, in the example shown, is in the form of a multigrid tube $V_{15}$ operated between its zero and saturation regions to obtain an amplitude limiting or leveling on the intermediate frequency oscillations, in a manner known and understood.

As will be understood, the invention may be used in connection with multiple frequency conversion of the input frequency of a radio relay station or for any other purpose, in which case the heterodyning auxiliary frequencies are obtained by suitable frequency multiplication.

A special advantage of the arrangement described is due to the fact that the frequency variations or degree of deviation of the intermediate frequency signals $e_2$ are substantially less than the frequency variations of the received and transmitted signals. Thus, in the case of frequency modulated signals, the maximum deviation of the intermediate frequency from the carrier or center frequency $f_2$ is substantially reduced compared with the maximum frequency deviation of the received and retransmitted oscillations. This makes it possible to employ intermediate frequency amplifiers having a correspondingly reduced band width or transmission characteristic, whereby interfering signals or disturbances falling outside the transmission band of the intermediate frequency amplifier will be suppressed. As a result, thermal and tube noise interference will be reduced considerably, an advantage being of special importance in the case of relay chains comprising a large number of individual relay links.

The frequency multiplier may also be in the form of an amplifier with the biasing voltages of the amplifier tubes so adjusted that operation takes place upon the non-linear portion of the tube characteristics. The harmonics produced in the plate circuit may be segregated by suitable filters in a manner well understood.

The receiver R, intermediate frequency amplifier IF and the transmitter T in Fig. 3 are of standard design and, in the example shown, comprise ordinary high frequency amplifier tubes $V_{13}$, $V_{14}$ and $V_{17}$, respectively.

While there have been shown and described a few desirable embodiments of the invention, it is understood that this disclosure is for the purpose of illustration and that various changes in the arrangements of parts and circuits as well as the substitution of equivalent circuits and elements for those herein shown and described, may be made without departing from the spirit and scope of the invention as defined in the appended claims.

I claim:

1. In a high frequency signaling system having an input circuit and an output circuit, means for changing the output frequency to bear a predetermined constant relation to the input frequency, said means comprising a heterodyne frequency converter connected to said input circuit for producing signals of intermediate frequency, an intermediate frequency amplier connected to the output of said converter, an amplitude limiter connected to the output of said amplifier, a pair of frequency multipliers connected to said limiter, means for applying energy of multiple frequency supplied by one of said multipliers to said converter to serve as heterodyning oscillation for said converter, and a further frequency converter having inputs connected to said intermediate frequency amplifier and to the other of said frequency multipliers to produce signal energy feeding said output circuit.

2. In a high frequency signaling system having an input circuit and an output circuit, means for changing the output frequency to bear a predetermined constant relation to the input frequency, said means comprising a first heterodyne frequency converter connected to said input circuit for producing signals of intermediate frequency, an intermediate frequency amplifier connected to said converter, a second heterodyne frequency converter connected to said amplifier and feeding said output circuit, an amplitude limiter connected to the output of said amplifier, and frequency multiplying means connected to said limiter for producing a pair of different harmonic components of the intermediate frequency to serve as a heterodyning oscillation for said first and second converter, respectively.

3. In a high frequency signaling system having an input circuit and an output circuit, means for changing the output frequency to bear a predetermined constant relation to the input frequency, said means comprising a first heterodyne frequency converter connected to said input circuit for producing signals of intermediate frequency, an intermediate frequency amplifier connected to said converter, a second heterodyne frequency converter connected to said amplifier and feeding said output circuit, and a pair of frequency multipliers both connected to the output of said amplifier for producing auxiliary heterodyning oscillations applied to said first and second converter, respectively.

4. In a high frequency signaling system having an input circuit and an output circuit, means for changing the output frequency to bear a predetermined constant relation to the input frequency, said means comprising a heterodyne frequency converter connected to said input circuit for producing signals of intermediate frequency, an intermediate frequency amplifier connected to said converter, a second heterodyne frequency converter connected to said amplifier and feeding said output circuit, and frequency multiplying means connected to the output of said amplifier for producing a pair of auxiliary heterodyning oscillations being different multiples of said intermediate frequency, and means for exciting said first and second converter each by one of said auxiliary oscillations, respectively.

5. In a high frequency signaling system having an input circuit and an output circuit, means for changing the output frequency to bear a predetermined constant relation to the input frequency, said means comprising a first heterodyne frequency converter connected to said input circuit for producing signals of intermediate frequency, an intermediate frequency amplifier connected to said converter, a second heterodyne frequency converter connected to said amplifier and feeding said output circuit, amplitude limiting means connected to the output of said amplifier frequency multiplying means connected to said limiting means for producing a pair of auxiliary oscillations having frequencies being different multiples of said intermediate frequency, and means for applying each of said auxiliary oscillations as heterodyning signals to one of said converters.

References Cited in the file of this patent

UNITED STATES PATENTS

| Number | Name | Date |
|---|---|---|
| 2,180,816 | Miller | Nov. 21, 1939 |
| 2,405,765 | Smith | Aug. 13, 1946 |
| 2,406,932 | Tunick | Sept. 3, 1946 |
| 2,421,727 | Thompson | June 3, 1947 |
| 2,452,048 | Hansen et al. | Oct. 26, 1948 |
| 2,505,043 | Guanella | Apr. 25, 1950 |